May 22, 1928.

F. ARNOLD 1,670,923

STEERING PROPELLER FOR AEROPLANES, DIRIGIBLES, SUBMARINES, AND THE LIKE

Filed March 23, 1927     2 Sheets-Sheet 1

Inventor:
Felix Arnold
by Hazard and Miller
Attorneys

May 22, 1928.

F. ARNOLD 1,670,923

STEERING PROPELLER FOR AEROPLANES, DIRIGIBLES, SUBMARINES, AND THE LIKE

Filed March 23, 1927    2 Sheets-Sheet 2

Inventor:
Felix Arnold.
By Hazard and Miller
Attorneys

Patented May 22, 1928.

1,670,923

UNITED STATES PATENT OFFICE.

FELIX ARNOLD, OF SANTA BARBARA, CALIFORNIA.

STEERING PROPELLER FOR AEROPLANES, DIRIGIBLES, SUBMARINES, AND THE LIKE.

Application filed March 23, 1927. Serial No. 177,544.

This invention relates to navigation of air craft, and more particularly to a propeller which is universally mounted on the end of a driving shaft of an air craft motor so that the same may aid the control members of the plane in their operation, or supersede these elements altogether.

A further object of this invention is to provide a novel means whereby the horizontal and vertical components of the travel of the plane may selectively be controlled.

A still further object of this invention is to provide an aeroplane propeller that is mounted for universal motion, and to provide novel means whereby this propeller may be controlled, which propeller and means are efficient in their operation, are unlikely to get out of order, and are strong and durable and are well adapted to perform the services required of the same.

With these and many other objects in view which will more readily appear as the nature of the invention is better understood, the same consists in the novel construction, combination, and arrangement of parts, which will hereinafter be more fully described, illustrated and claimed.

The essential features of the invention involved in the carrying out of the objects indicated are susceptible to modification; but a preferred embodiment of the invention is shown in the accompanying drawings, in which.

Figure 1:
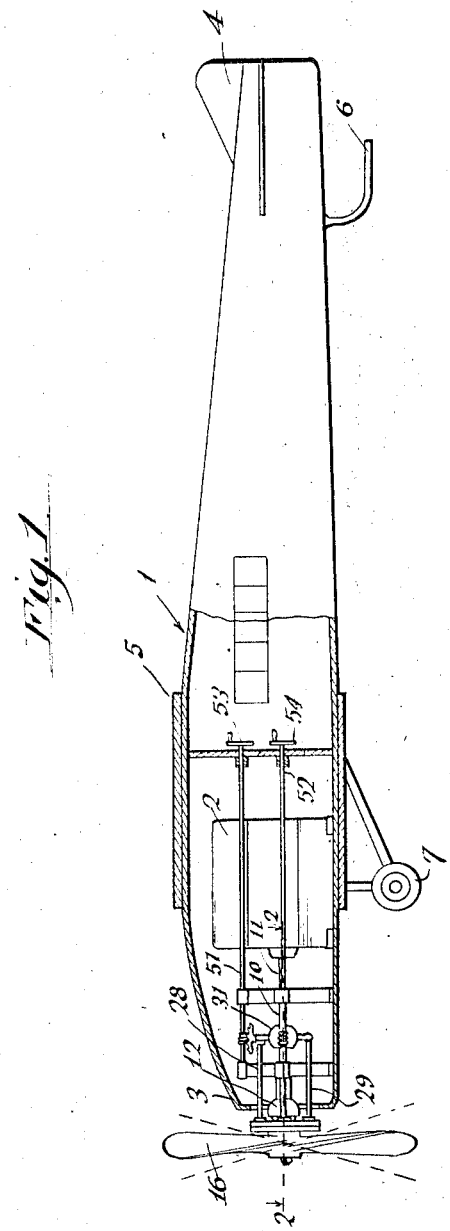
Figure 1 is a detailed view of an assembled aeroplane constructed in accordance with the principles of my invention.
Figure 2:
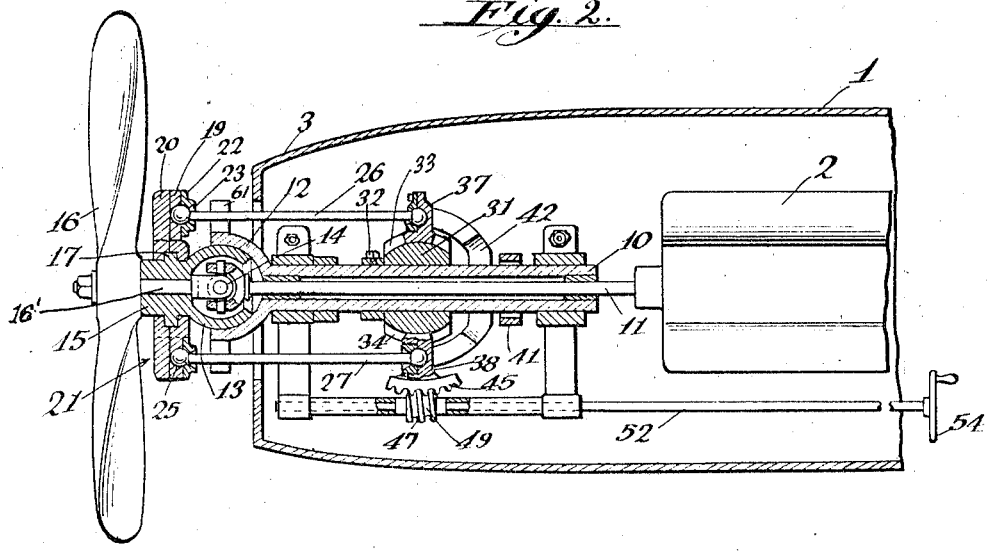
Figure 2 is a fragmentary top plan view of the device taken substantially along the lines 2—2 of Figure 1.
Figure 3:
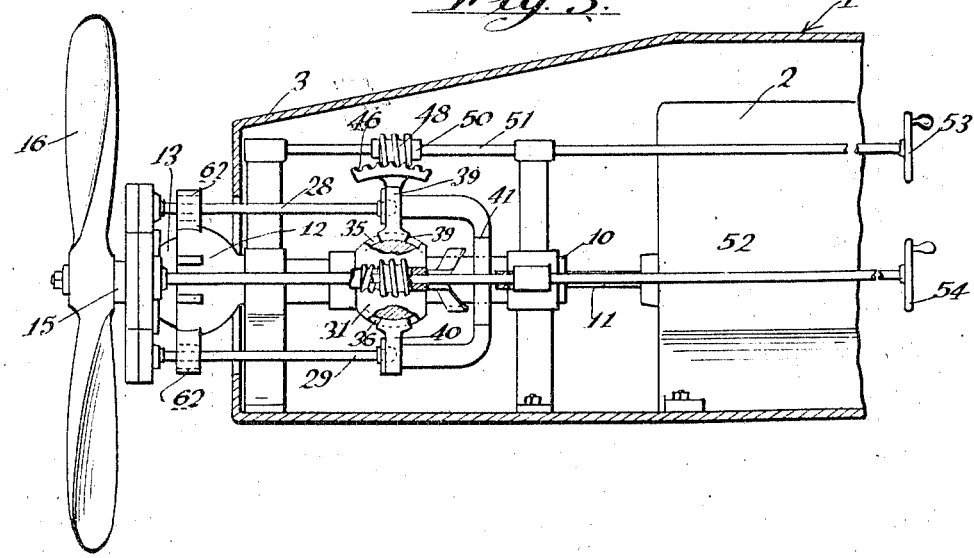
Figure 3 is a side elevation partly in section, showing portions of the device broken away to more clearly reveal the operative parts of the same.

This device involves in its general organization, a body member 1, in which there is mounted the conventional type of an internal combustion engine 2. This body 1 has a nose 3 and tail 4, wings 5, a skid 6 and supporting roller 7.

The parts thus far described are merely conventional in their form and widely known in the art of aerial navigation. No particular claim is made towards their novelty. My invention consists in rigidly supporting within the plane, a stationary, elongated shaft housing 10, in which is disposed a shaft 11 leading from the combustion engine 2. The outer end of this housing 10 is provided with a cup-shaped portion 12. Within this cup-shaped portion 12 is a hollow portion of a ball 13, bearing tightly against the cup-shaped portion 12. A universal joint designated at 14 is mounted on the end of the shaft 11 and occupies a position centrally of the portion of the hollow ball 13. An element of this universal joint is connected to a stub shaft 16' of a propeller 16. This shaft 16' is revoluble within a thrust shank 15 which has an annular flange 17 fitting within and between two sections 19 and 20 of an annular thrust plate 21. The thrust plate 21 is provided with four sockets 25 evenly spaced in the after face thereof, and within each of which the end of one of the control rods 26, 27, 28, or 29, is adapted to be received. In order to retain the rods in their respective sockets, the end of each is enlarged and a ring 22 positioned thereover and secured rigidly to the thrust plate 21. An aperture 23 is provided in the ring 22 in register with each of the sockets 25, to permit the associated rod to extend therethrough, these apertures being smaller than the enlarged end of the rod. A collar 31 is mounted around the stationary shaft housing 10, and is adapted to be secured thereto by means of a suitable bolt or the like 32. This collar is substantially spherical in shape, and is provided with opposed, arcuate grooves 33 and 34, and opposed arcuate grooves 35 and 36, within which grooves are mounted slidable socket members 37 and 38, 39 and 40. Each of these slidable socket pieces is adapted to receive the other end of the associated control rod 26, 27, 28 or 29 respectively. A yoke 42 connects these slidable socket pieces 37 and 38, and a yoke 41 connects the slidable socket pieces 39 and 40. The socket members 38 and 39 each have one end thereof disposed in the grooves 34 and 35 respectively, and the outer ends of these socket pieces are arcuate in form and provide arcuate racks 45 and 46 respectively, which racks are adapted to mesh with the teeth 47 and 48 of worm-wheels 49 and 50 respectively. These worm-wheels 47 and 48 are mounted on rods 51 and 52 respectively, which rods are supported on the frame of the aeroplane and have on their inner ends, control wheels 53 and 54 respectively, which in turn are provided with handles 55 and 56 respectively, whereby they may be operated. The cupped portion 12 of the shaft housing 10 is provided with a lateral, annular flange 61, through which there are a plurality of slots 62, each slot being adapted to receive and guide one of the control rods 26, 27, 28, or 29, and prevent the thrust plate from turning.

The above parts in essence constitute my entire invention. I will now describe in detail, the operation of my device. Rotation of the control wheels 53 and 54 will impart motion to the rods 51 and 52 respectively, which in turn, through the medium of the worm-wheels and racks 45 and 46, will impart a slight longitudinal motion to the control rods 26 and 27, or to the control rods 28 and 29 as the case may be, according to which control wheel is being operated. As a result, the thrust plate 21 may be moved, which in turn, through its flanged connection with the thrust shank 15, will alter the angle of inclination of the axis of rotation of the propeller 16. The control wheel 54 controls the inclination of the propeller from the vertical, and the control wheel 53 controls the inclination of the propeller from the horizontal axis of the machine.

From the foregoing, it is thought that the construction, use and many advantages of the herein-described improved steering propeller will be readily apparent without further description, and it will also be understood that changes in the form, proportion, and minor details of construction may be resorted to without departing from the spirit of the invention or sacrificing any of the advantages thereof.

I do not desire to limit myself to the use of my invention in aerial navigation. In addition to applying the principles of my invention to the navigation of aeroplanes, dirigibles, helicopters or the like, I contemplate modifying the details of construction of the same to readily adapt themselves to use on submarines and all manner of undersea craft. Only in so far as I particularly point out my invention and claim the same in the appended claims, do I desire to limit myself.

It will be understood that various changes in the details of construction may be made without departing from the spirit or scope of the invention as defined by the appended claims.

I claim:

1. In combination with a craft having a body, a driving motor, and a propeller, of a cup-shaped housing rigid with said body, a hollow ball seated for universal movement within said housing, a shank extending from said ball and adapted to take the thrust from the propeller, a shaft operatively connecting the motor and propeller, said shaft being revoluble within the housing, ball and shank, and a universal joint interposed in said shaft and positioned within said ball and housing.

2. In combination with a craft having a body, a driving motor, and a propeller, of a cup-shaped housing rigid with said body, a hollow ball seated for universal movement within said housing, a shank extending from said ball and adapted to take the thrust from the propeller, a shaft operatively connecting the motor and propeller, said shaft being revoluble within the housing, ball and shank, a universal joint interposed in said shaft and positioned within said ball and housing, and means for determining the position of said hollow ball within said housing.

3. In combination with a craft having a body, a driving motor, and a propeller, of a cup-shaped housing rigid with said body, a hollow ball seated for universal movement within said housing, a shank extending from said ball and adapted to take the thrust from the propeller, a shaft operatively connecting the motor and propeller, said shaft being revoluble within the housing, ball and shank, a universal joint interposed in said shaft and positioned within said ball and housing, means for determining the position of said hollow ball within said housing, and means for locking said hollow ball in selected position.

4. In combination with a craft having a body, a driving motor, and a propeller, of a cup-shaped body, a hollow ball seated for universal movement within said housing, a drive shaft operatively connected to the motor and terminating in the housing, a stub shaft rigid with the propeller and terminating within the housing, and a universal joint within the housing and operatively connecting said shafts.

5. In combination with a craft having a body, a driving motor, and a propeller, of a cup-shaped housing rigid with said body, a hollow ball seated for universal movement within said housing, a thrust shank extending from said ball and adapted to take the thrust from the propeller, a shaft operatively connected to the motor and terminating within the housing, a stub shaft rigid with the propeller and revoluble within said shank and terminating within the housing, and a universal joint operatively connecting said shafts.

6. In combination with a craft having a body, a driving motor, and a propeller, of a cup-shaped housing rigid with said body, a hollow ball seated for universal movement within said housing, a flanged thrust shank extending from said ball and adapted to take the thrust from the propeller, a shaft operatively connected to the motor and terminating within the housing, a stub shaft rigid with the propeller and revoluble within said shank and terminating within the housing, a universal joint operatively connecting said shafts, a thrust plate engaging said flanged thrust shank, and means for locking said thrust plate in position to determine the angle of inclination of the axis of rotation of the propeller.

7. In combination with a craft having a body, a driving motor, and a propeller, of a cup-shaped housing rigid with said body, a hollow ball seated for universal movement within said housing, a flanged thrust shank extending from said ball and adapted to take the thrust from the propeller, a shaft operatively connected to the motor and terminating within the housing, a stub shaft rigid with the propeller and revoluble within said shank and terminating within the housing, a universal joint operatively connecting said shafts, a thrust plate engaging said flanged thrust shank, means for locking said thrust plate in position to determine the angle of inclination of the axis of rotation of the propeller, a plurality of rods mounted for universal movement within said thrust plate, means for holding certain of said rods stationary, and means for moving others of said rods to alter the angle of inclination of the axis of rotation of the propeller.

8. In combination with a craft having a body, a driving motor, and a propeller, of a cup-shaped housing rigid with said body, a hollow ball seated for universal movement within said housing, a flanged thrust shank extending from said ball and adapted to take the thrust from the propeller, a shaft operatively connected to the motor and terminating within the housing, a stub shaft rigid with the propeller and revoluble within said shank and terminating within the housing, a universal joint operatively connecting said shafts, a thrust plate engaging said flanged thrust shank, means for locking said thrust plate in position to determine the angle of inclination of the axis of rotation of the propeller, a spherical collar rigid with said housing, a plurality of socket members slidably mounted upon said collar, each of said socket members having the other end of one of said rods mounted therein for pivotal movement, means for holding certain of said socket members rigid, and means for moving others of said socket members to alter the angle of inclination of the axis of rotation of the propeller.

9. In combination with a craft having a body, a driving motor, and a propeller, of a cup-shaped housing rigid with said body, a hollow ball seated for universal movement within said housing, a flanged thrust shank extending from said ball and adapted to take the thrust from the propeller, a shaft operatively connected to the motor and terminating within the housing, a stub shaft rigid with the propeller and revoluble within said shank and terminating within the housing, a universal joint operatively connecting said shafts, a thrust plate engaging said flanged thrust shank, means for locking said thrust plate in position to determine the angle of inclination of the axis of rotation of the propeller, a spherical collar rigid with said housing, a plurality of socket members slidably mounted upon said collar, each of said socket members having the other end of one of said rods mounted therein for pivotal movement, a yoke rigidly connecting each pair of socket members on opposite sides of the collar, an arcuate rack carried by each of said yokes, a worm wheel engaging each of said racks, and means remote from said worm wheels for rotating either of them to alter the angle of inclination of the axis of rotation of the propeller.

In testimony whereof I have signed my name to this specification.

FELIX ARNOLD.